A. J. HALL & L. G. RILEY.
CONTROL SYSTEM FOR ELECTRIC MOTORS.
APPLICATION FILED JULY 9, 1913.
1,143,956.
Patented June 22, 1915.
2 SHEETS—SHEET 1.
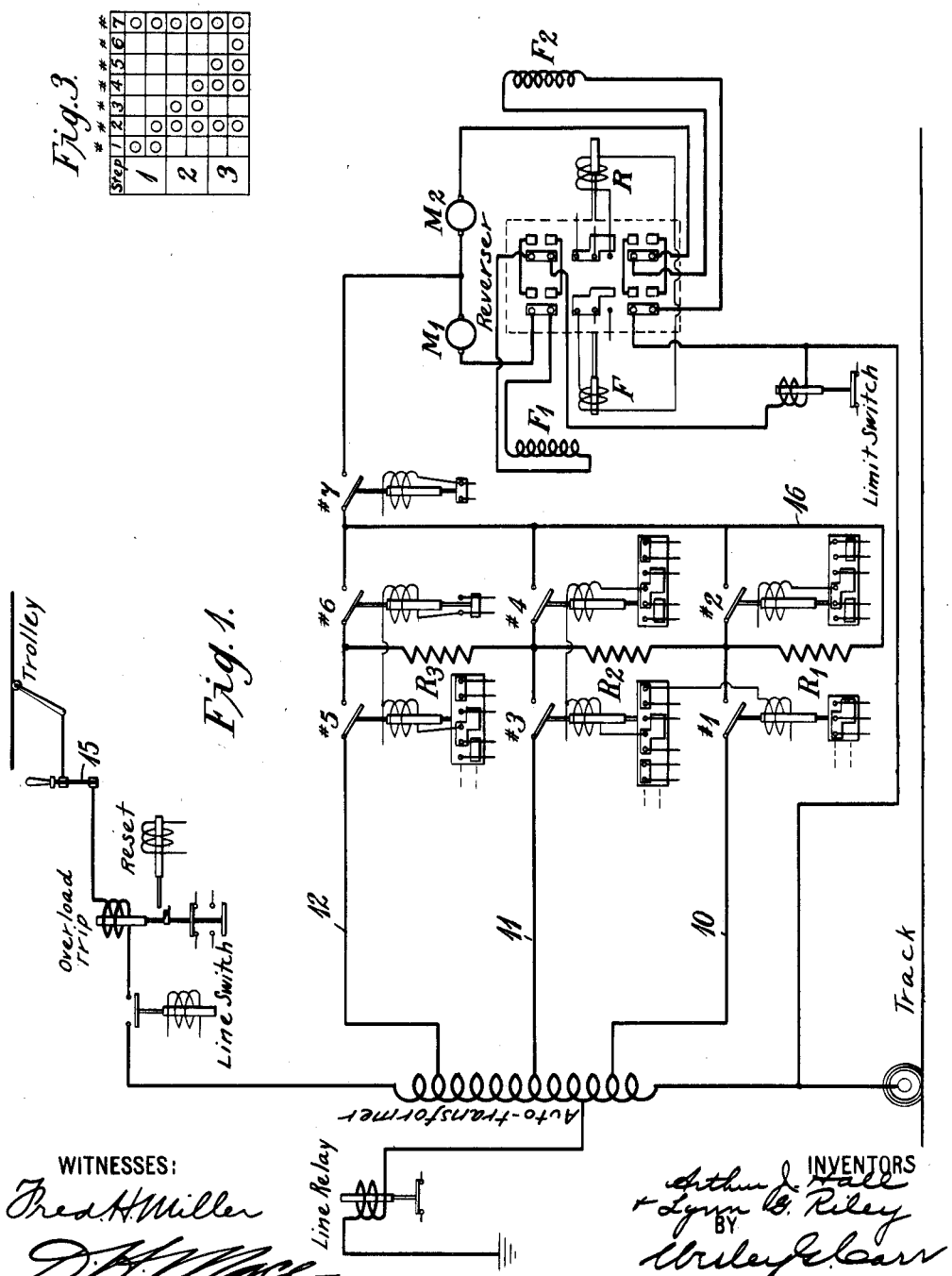

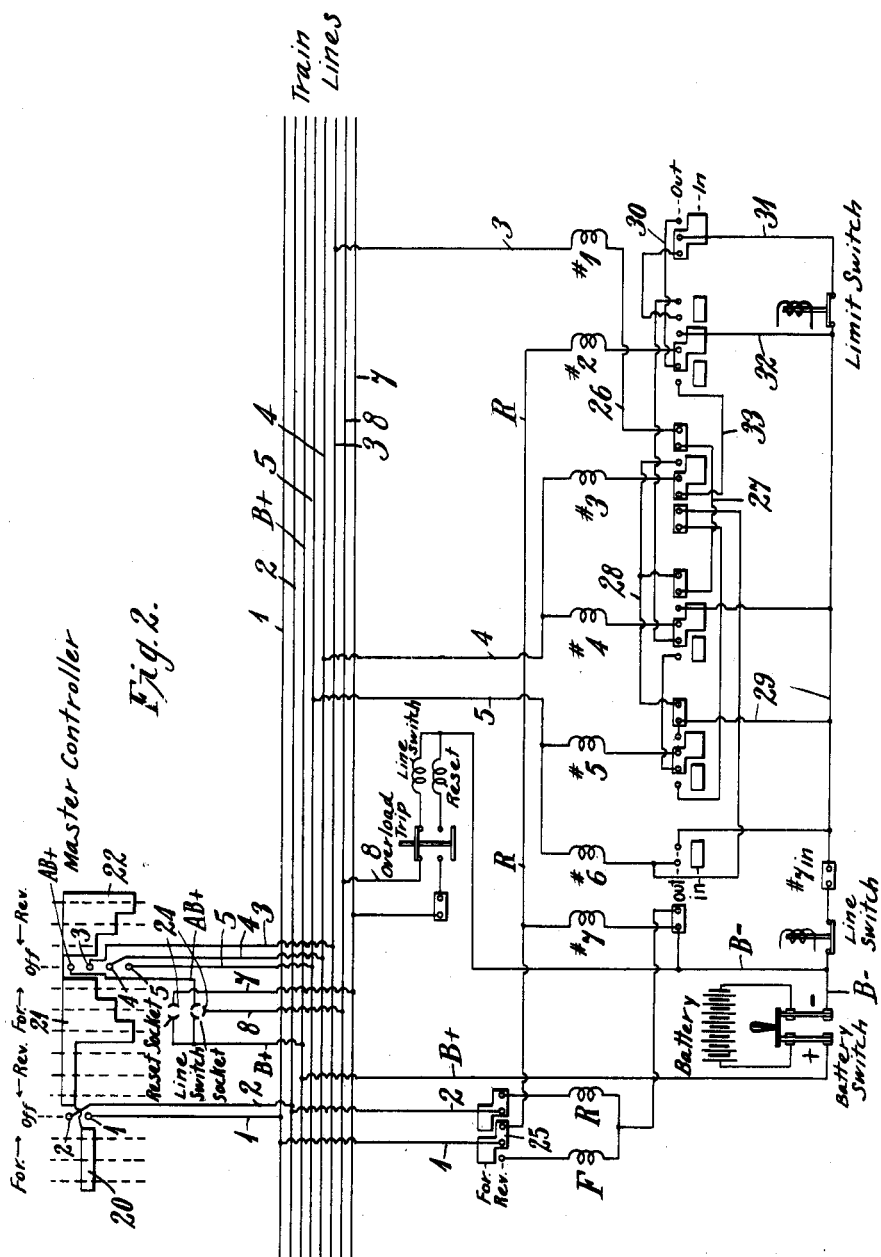

UNITED STATES PATENT OFFICE.

ARTHUR J. HALL AND LYNN G. RILEY, OF WILKINSBURG, PENNSYLVANIA, ASSIGNORS TO WESTINGHOUSE ELECTRIC AND MANUFACTURING COMPANY, A CORPORATION OF PENNSYLVANIA.

CONTROL SYSTEM FOR ELECTRIC MOTORS.

1,143,956.  Specification of Letters Patent.  Patented June 22, 1915.

Application filed July 9, 1913. Serial No. 778,066.

*To all whom it may concern:*

Be it known that we, ARTHUR J. HALL, a subject of the King of Great Britain, and LYNN G. RILEY, a citizen of the United States, and residents of Wilkinsburg, in the county of Allegheny and State of Pennsylvania, have invented a new and useful Improvement in Control Systems for Electric Motors, of which the following is a specification.

Our invention relates to control systems for electric motors, and it has special reference to systems adapted to control the operation of the motors of an electric locomotive or motor car operated upon a single phase alternating current railway system.

One of the objects of our invention is to provide a system of the above indicated character which shall be simple in arrangement, easy to manipulate, and particularly adapted for the automatic control of a plurality of motors during the period of acceleration.

Another object of our invention is to provide a control system for single phase motors which shall be adapted for a plurality of economical running positions in which the energy is directly supplied to the motors and is not consumed by resistors or other energy-consuming devices.

A still further object of our invention is to provide automatic means which shall be dependent upon predetermined circuit conditions for progressively connecting the motors through a plurality of resistors to a plurality of taps provided in an auto-transformer which is normally in circuit between the source of energy and the return circuit.

A still further object of our invention is to provide a control system for governing the operation of single-phase alternating current motors, embodying a plurality of electrically operated or electrically controlled main switches which are provided with interlock switches and having the train line wires and the energizing coils of the main switches connected through the master controller to the positive side of a control battery or similar source of energy, and the interlock switches and the limit switch to the negative side thereof, in order to assure a positive progression of the switches and to prevent an accidental progression thereof and consequent acceleration of the motors in case of a break in any of the train line wires.

A still further object of our invention is to provide an inexpensive control system which shall be easily installed and maintained at a low cost and which, by reason of its automatic features, shall prevent abuse of the motors by subjecting them to an abnormal rate of acceleration.

In the prior art, it has been customary to employ control systems for single phase motors which embody auto-transformers having a plurality of taps and a plurality of so-called "preventive coils" through which the energy is supplied to the motors. Such an arrangement of circuits, however, necessitates an excessive number of switches which complicates the system, increases its cost and reduces its reliability and effectiveness. Another type of control which has been employed, utilizes a plurality of resistors in place of the preventive coils referred to, which results in fewer switches and better operation. However, this class of systems has never been adapted for automatic operation, nor for a positive progression of the several switches.

It is our purpose to provide a system of control which shall overcome the difficulties of the prior art and shall obtain the objects and results heretofore mentioned.

Our invention may best be understood by reference to the accompanying drawings, in which—

Figure 1 is a diagrammatic view showing the main circuit apparatus and connections of a control system embodying our inventions, the auxiliary control devices and control circuits which are directly associated therewith, being indicated in part. The connections between the several control devices are omitted for the sake of clearness. Fig. 2 is a diagrammatic view of the control circuits which are adapted to govern the operation of the apparatus shown in Fig. 1, the various auxiliary interlock switches being distributed over the diagram in convenient locations without respect to the main switches with which they are associated. By so doing, the diagram of connections is greatly simplified and the operation and circuit connections will be more easily understood. Fig. 3 is a chart showing the positions of the various switches which correspond to the different running positions or steps of the master controller. Charts of this type are well known in the art and will be readily understood.

In order to set forth our invention with clearness, we shall first describe the main circuit connections shown in Fig. 1 and the general operation of the system, and then will discuss the control circuits and the operation thereof.

Reference may now be had to Fig. 1 in which the system shown comprises a supply circuit conductor marked "Trolley," a return circuit conductor marked "Track," a plurality of motors having armatures $M^1$ and $M^2$ and field windings $F^1$ and $F^2$, a transforming device marked "Autotransformer" which is adapted to be connected between the "trolley" and the "track" and is provided with a plurality of intermediate taps 10, 11 and 12, a plurality of resistors $R^1$, $R^2$ and $R^3$ severally connected between the taps 10, 11 and 12, a plurality of electrically operated switches #1, #2, #3, #4, #5 and #6 which are connected in pairs in series circuit with the several taps 10, 11 and 12, the switches of each pair being connected on opposite sides of the point at which the resistors $R^1$, $R^2$ and $R^3$ are connected, these several switches being adapted to govern the circuit connections for the resistors $R^1$, $R^2$ and $R^3$, a motor circuit switch #7 connected between the motors $M^1$ and $M^2$ and the taps 10, 11 and 12, a switching device marked "Reverser" for adjusting the connections of the field windings $F^1$ and $F^2$, a "limit switch" connected in series with one of the motors for governing the automatic operation of the system in accordance with predetermined circuit conditions, a relay marked "Line relay" for interrupting the operation of the system in case of a no-voltage condition, a main switch marked "Line switch" connected between the "trolley" and the "auto-transformer" and serving as a circuit breaker, and a relay device marked "Overload trip" for governing the operation of the "line switch" in accordance with current conditions.

All of the apparatus referred to, with the exception of the "overload trip," is of well known construction and those skilled in the art are familiar with their operation, therefore, no description of either their construction or operation will be given. It should be noted, however, that, although the several switches #1 to #7, inclusive, have been illustrated as operated directly by electromagnets, we prefer to employ pneumatically operated switches, in which case, the several electro-magnets illustrated will merely be used to control the operation of suitable valves associated with air cylinders of any well-known type. The switches #1 to #7, inclusive, are adapted to occupy two positions, one in which the switch is open and termed the "switch-out position" and the other in which the switch is closed and termed "switch-in position." The electromagnets associated with the switches are severally energized when the switches occupy their "switch-in positions."

The "overload trip" is connected in series circuit between the "trolley" and the "autotransformer" and is traversed by the full current of the motors. Under abnormal conditions, the "overload trip" is energized and raised in the usual manner and is retained in its raised position by an auxiliary device until energy is supplied to its "reset" coil and permits it to fall into its normal operative position.

Assuming that the several devices occupy the positions shown in Fig. 1, the acceleration of the motors in a forward direction may be accomplished by first closing the "line switch," motor circuit switch #7 and the resistor switch #1, thus completing a circuit from the "trolley" through switch 15, the energizing coil of the "overload trip," the "line switch," a portion of the windings of the "auto-transformer," conductor 10, switch #1, resistor $R^1$, conductor 16, switch #7, and thence, in a divided multiple circuit, through the armatures $M^1$ and $M^2$ and field windings $F^1$ and $F^2$ of the several motors, as well as the "reverser," to the return circuit "track," the "limit switch" being included in circuit with the armature $M^1$ and field winding $F^1$. Under these conditions, energy is supplied to the motors from tap 10 of the "auto-transformer" through the resistor $R^1$, and the motors are thus started into operation, as will be readily understood. Switch #2 is then closed, thus short circuiting the resistor $R^1$ and connecting the motors directly to the "auto-transformer," these connections corresponding to the first running position.

In order to increase the motor speed, switch #3 is closed, thus stepping up the motor connections to tap 11 and inserting resistor $R^2$ in circuit therewith. Immediately upon the closure of switch #3, switch #1 is caused to open, thus insuring only a temporary local closed circuit upon the "auto-transformer" through resistor $R^2$. Following the closure of the switch #3, the resistor $R^2$ is excluded from circuit by closing switch #4, thus connecting the motors directly to tap 11 of the "auto-transformer." These connections constitute the arrangement of circuits for the second running position. Further increases of motor speed may be secured by transferring the "auto-transformer" connection to tap 12 and inserting resistor $R^3$ in circuit with the motors by effecting the closure of switch #5. As switch #5 is closed, switch #3 is opened.

Switch #6 is then closed to short circuit resistor R³ and connect the motors directly to tap 12, in which case, substantially full operating voltage is impressed upon the motors and consequently full-speed conditions are obtained.

It will be understood that as the connections of the motors are progressively changed to taps 10, 11 and 12 of the "auto-transformer," the voltage impressed upon the motors is increased in steps. Furthermore, an intermediate step between each two successive running positions is effected by means of the resistors R¹, R² and R³, each of which is successively included in circuit and excluded therefrom to prevent a local short circuit of the "auto-transformer."

Having described the general operation of the system, the arrangement of circuits of the control system and the operation thereof will be set forth.

Referring now particularly to Fig. 2, the control circuits shown are adapted to be arranged and governed by means of a hand-operated switching device marked "Master controller" which comprises a rotatable drum (not shown) having a plurality of conducting segments 20, 21 and 22, a development of which is shown in the figure. The several conducting segments just referred to, are electrically connected and are adapted to coöperate with a plurality of contact terminals 1, 2, AB+, 3, 4 and 5 which are divided into two groups that are respectively disposed intermediate the conducting segments 20 and 21, and 21 and 22 when the controller occupies its off position. The "master controller" is adapted for movement in opposite directions, one of which arranges the circuit connections for forward rotation of the motors and the other for reverse operation. Three forward running positions are provided, in which the conducting segments engage the coöperating contact terminals along the position-indicating lines 1, 2 and 3 marked "For", and a like number of reverse positions 1, 2 and 3 and marked "Rev".

Associated with the "master controller" are a plurality of sockets marked "Reset socket" and "Line switch socket" which are adapted to receive a conducting plug (not shown) for making electrical connection between the several conducting segments 24 thereof, for a purpose to be hereinafter pointed out.

As already mentioned, the control system is adapted to arrange the circuits for three running positions or for full automatic acceleration in which the circuit connections are governed to effect a smooth acceleration of the motors from rest up to full-speed operation. Provision is made to secure automatic acceleration for any position of the "master controller".

Assuming the apparatus and connections to be as shown in the diagram, the acceleration of the motors in a forward direction through the several running positions is secured as follows:—The motorman or operator first inserts a suitable contact plug (not shown) into the receptacle marked "Line switch socket", thereby establishing electrical connections between the several conducting segments 24 thereof and completing a circuit from the positive side of the "battery" through the "battery switch", conductor and "train line" B+, "line switch socket" and plug (not shown), conductor and "train line" 8, "overload trip", "line switch" coil conductor B—, and the "battery switch" to the negative side of the "battery". Thus the energizing coil of the "line switch" effects the closure thereof and supplies energy from the "trolley" to the "auto-transformer", as hereinbefore described. Concurrently with this operation, a circuit is established from the "line switch socket" through conductor AB+, to contact terminal AB, and, if the "master controller" is then moved into position "for" 1, the circuit is completed through conducting segments 21 and 20, contact terminal 1, conductor and "train line" 1, conducting segment 25 of the "reverser", conductor R, energizing coil of switch #7, conductor B— and the "battery switch" to the "battery". Switch #7 is thereby closed, which causes the closure of its interlock switch #7—in.

At the same time, a circuit is established from the conducting segment 21 of the "master controller" through contact terminal 3, conductor and "train line" 3, energizing coil of switch #1, conductor 26, interlock switch #3—out, conductor 27, interlock switch #4—out, conductor 28, interlock switch #5—out, conductor 29, interlock switch #7—in, "line relay", conductor B— and "battery switch" to the "battery". Upon the completion of the circuit just recited, switch #1 is closed immediately after the closure of switch #7 is effected, thereby completing a main motor circuit from tap 10 of the "auto-transformer" through switch #1, resistor R¹, conductor 16, and switch #7 to the driving motors. The motors are then started from rest in a forward direction and, as soon as the current traversing them decreases to a value for which the "limit switch" is adjusted, it is allowed to fall and bridge its stationary contact members, thereby completing a control circuit from conductor R through the energizing coil of switch #2, interlock switch #2—out, conductor 30, interlock switch #1—in, conductor 31, "limit switch" and thence to the negative side of the "battery" through a circuit already traced. Thus switch #2 is closed in accordance with the action of the "limit switch", thereby excluding resistor R¹ from the main motor circuit and establishing the circuits for the first running position. Upon the closure of switch #2, a holding circuit 32 is connected to the energizing coil thereof through interlock switch #2—in. If now, the "master controller" be moved to its "for" 2 position, "train line" and conductor 4 are energized and a circuit is completed through the energizing coil of switch #3, interlock switch #3—out, conductor 33, interlock switch #2—in, conductor 30, interlock switch #1—in, conductor 31, and thence through the "limit switch" to the "battery" through a circuit already traced. Switch #3 is thus closed to deliver energy from tap 11 of the "autotransformer" through resistor $R^2$ and switches #2 and #7 to the driving motors. As soon as switch #3 closes, it transfers the connection of its energizing coil to a holding circuit 28, through interlock switch #3—in, and, at the same time, interrupts the energizing circuit of switch #1 at interlock switch #3—out. Thus, switch #1 is immediately allowed to open to break a local closed circuit across a section of the "autotransformer".

Following the opening of switch #1 and, in accordance with the action of the "limit switch," switch #4 is energized and closed to short circuit the resistor $R^2$ and connect the motors to the tap 11 of the "auto-transformer" in the second running position.

By reason of the ease with which those skilled in the art may trace the control circuits, and may understand the operation of the system in view of the detailed description thereof that has already been given, it is not deemed necessary to trace the remaining circuits in detail, but only to recite, in a general way, the further operation of the system. The circuits and the operation will obviously be similar to those hereinbefore discussed.

In order to secure a higher speed of the motors, the "master controller" is moved into its position "For" 3, thereby energizing the "train line" and conductor 5 and the energizing coil of switch #5 through a circuit including interlock switches #5—in, #4—in, #2—in, and #1—out. As switch #5 closes, it transfers its connection to a holding circuit 29 and also interrupts the energizing circuit of switch #3. The closure of switch #5 connects the motors through resistor $R^3$ to tap 12 of the "autotransformer." As soon as the "limit switch" permits, switch #6 is energized from conductor 5 through several interlock switches and is thus closed to exclude resistor $R^3$ and connect the driving motors directly to tap 12 of the "auto-transformer," whereby the highest operating voltage is impressed upon the motors and full-speed conditions are attained.

In view of the description of the operation of the system step-by-step just given, it will be evident that full automatic operation may be secured by moving the "master controller" initially into its third running position. In this case, the several switches are automatically controlled in accordance with predetermined current conditions and in a predetermined sequence, to bring the motors gradually and uniformly up to full-speed running conditions. Any intermediate running position may be secured by moving the "master controller" to the position corresponding to the operating conditions desired.

One of the advantageous features of the system of our invention is that the "master controller" and "train lines" are connected to the positive side of the "battery," or other source of energy, while the interlock switches and the "limit switch" are connected to the negative side thereof. Thus, the operation is positive and reliable, and unexpected acceleration of the motors cannot be caused by an accidental break in any of the "train lines," as has been possible in systems of this type heretofore.

In the event of a no-voltage condition obtaining upon the system, the "line relay" is immediately dropped to interrupt the energizing circuits of the switches #1 to #6, inclusive, thereby making it necessary to start the operation again from the initial position.

In case an abnormal current traverses the circuit, the "overload trip" is raised and thus deënergizes the "line switch" and causes it to open the main circuit. By reason of the accessories with which the "overload trip" is provided, it is maintained in its raised inoperative position until the plug (not shown) is removed from the "line switch socket" and inserted into the "reset socket" to establish a circuit from the "reset socket" through the conductor and "train line" 7, interlock switch #7—out, "overload trip" and "reset coil" to conductor B—. Upon energization of the "reset coil" the "overload trip" is allowed to drop into its initial position to bridge its contact terminals and to complete a circuit through the energizing coil of the "line switch." In order to close the "line switch," it is then necessary to insert the plug (not shown) into the receptacle "line switch socket" after which the operation of the system is similar to that hereinbefore described.

Reverse operation of the driving motors may be secured, either step-by-step or automatically, by moving the "master controller" into any of its positions "Rev." 1, 2 and 3. No description of this operation will be given as it is similar to that already described and will readily be understood by those skilled in the art.

We have shown our invention and described its operation as applied to the control of railway motors, but it is in no sense restricted to such service and may be employed in connection with the control of any electrically propelled vehicle or the like. Our invention is set forth in, what we now consider to be, its preferred embodiment but, it is our intention to cover by the appended claims all modifications therein which do not depart from the spirit and scope of our invention.

We claim as our invention:

1. In a control system, the combination with a source of energy, an electric motor adapted to be connected thereto, and a plurality of resistors adapted to be successively connected to said source and in series with said motor, of a plurality of switching devices for effecting said connections, and means for causing an automatic operation of said switching devices during the accelerating period of said motor.

2. In a control system, the combination with a source of energy, an electric motor adapted to be connected thereto, and a plurality of resistors adapted to be successively connected to said source and in series with said motor, of electro-responsive means for automatically effecting the connections of said motor and said resistors during the period of accelerating said motor.

3. In a control system, the combination with a source of energy, an electric motor adapted to be connected thereto, a plurality of resistors adapted to be successively connected to said source and in series with said motor, and a plurality of independently operated switches for effecting said connections, of automatic means dependent upon the current traversing said motor for governing the progressive closure of said switches and effecting a smooth acceleration of said motor.

4. In a control system, the combination with a source of energy, an electric motor adapted to be connected thereto, and a plurality of resistors adapted to be successively connected to said source and in series with said motor, of a plurality of electro-magnetically operated switches for arranging the connections of said motor and said resistors, and automatic means for governing the operation thereof in accordance with predetermined circuit conditions.

5. In a control system, the combination with a source of energy, an electric motor adapted to be connected thereto, and a plurality of resistors adapted to be successively connected to said source and in series with said motor, of a plurality of electro-magnetically operated switches for arranging the connections of said motor and said resistors, and an electro-responsive relay and plurality of interlock switches for automatically controlling the operation of said electromagnetically operated switches in accordance with the current traversing said motor.

6. In a control system, the combination with a source of energy, a transforming device connected thereto having a plurality of intermediate taps, resistors severally connected between said taps and a plurality of switching devices disposed in pairs in said taps, of an electric motor adapted to be successively connected in series circuit with said taps and said resistors and means for automatically controlling the operation of said switching devices to effect said connections.

7. In a control system, the combination with a derived source of energy having a plurality of intermediate taps, an electric motor adapted to be successively connected in circuit with said taps, and a plurality of resistors respectively connected between said taps, of automatic means for effecting the connections of said motor in a predetermined sequence.

8. In a control system, the combination with an auto-transformer having a plurality of taps, a plurality of resistors severally connected between said taps, and a plurality of electrically operated switches connected in each tap in pairs, one on each side of the associated resistors, of an electric motor, and automatic means for governing the operation of said switches to cause said motor to be connected successively to said taps through the respective resistors during the acceleration of said motor.

9. In a control system, the combination with a source of energy divided into sections and having intermediate taps, a plurality of resistors and an electric motor, of independently operated switches for successively connecting said resistors temporarily in multiple to said respective sections and in series with said motor, and then to said taps and in series with said motor, and means for governing the progressive operation of said switches in accordance with circuit conditions.

10. In a control system, the combination with a source of energy having a plurality of taps and intermediate sections, an electric motor adapted to be successively connected to said taps, and independently operated switches for effecting the connections of said motor to said taps, of a plurality of resistors adapted to be successively connected between adjacent taps in multiple to said intermediate sections of said source of energy and in series with said motor, and automatic means for governing the operation of said switches in accordance with current conditions.

11. In a control system, the combination with a source of energy divided into sections and having intermediate taps, a plurality of sections of resistance and an electric motor, of a plurality of independently operated switches between the intermediate points of said resistance sections and the motor and between said points and the respective taps, and means for automatically effecting the closure of said switches in a predetermined order and under predetermined conditions.

12. In a control system, the combination with a source of energy divided into sections and having intermediate taps, a plurality of sections of resistance and an electric motor, of a plurality of independently operated switches between the intermediate points of said resistance sections and the motor and between said points and the respective taps, and automatic means for governing the closure of said switches in a predetermined sequence to connect said motor successively to said taps and in series with said resistor sections without interrupting the motor circuit and short-circuiting any section of the source of energy.

13. In a control system, the combination with a source of energy divided into sections and having intermediate taps, a plurality of resistors respectively adapted to be connected in multiple to the respective sections of said source, and an electric motor adapted to receive energy from said source, of a plurality of independently operated switches for successively connecting said motor to said intermediate taps and in series circuit with the respective resistors and for connecting each resistor in multiple to its corresponding section of said source in stepping up from one tap to another, and means for rendering the progressive closure of said switches dependent upon the motor current.

In testimony whereof, we have hereunto subscribed our names this 27th day of June, 1913.

ARTHUR J. HALL.
LYNN G. RILEY.

Witnesses:
B. B. HINES,
LOEL F. LIVERMORE.